United States Patent [19]

Tippmann

[11] 4,157,885

[45] Jun. 12, 1979

[54] MOLD CONSTRUCTION METHOD AND APPARATUS FOR MAKING PLASTIC BACKINGS FOR SKATING RINK DASHER BOARDS

[76] Inventor: Joseph R. Tippmann, 211 West St., New Haven, Ind. 46774

[21] Appl. No.: 864,014

[22] Filed: Dec. 23, 1977

[51] Int. Cl.$^2$ ............................................. B29C 17/04
[52] U.S. Cl. .................................. 264/553; 425/388; 264/259
[58] Field of Search ..................... 425/388; 264/92, 90

[56] References Cited

U.S. PATENT DOCUMENTS

| | | | |
|---|---|---|---|
| 2,690,593 | 10/1954 | Abercrombie | 425/388 X |
| 3,025,566 | 3/1962 | Kostur | 425/388 |
| 3,133,314 | 5/1964 | Arnould et al. | 425/388 |
| 3,146,143 | 8/1964 | Bolesky et al. | 156/212 |
| 3,553,784 | 1/1971 | Shuman | 425/388 |
| 3,577,593 | 5/1971 | Jackson | 425/388 |

Primary Examiner—Robert L. Spicer, Jr.
Attorney, Agent, or Firm—Joseph J. Baker; Gerald J. Ferguson, Jr.

[57] ABSTRACT

A mold construction, method and apparatus for forming backing shells for skating ring dasher boards out of a single piece of material is disclosed. The mold comprises a vacuum box and oppositely disposed forming members loosely positioned in the box to form a mold cavity. A sheet of plastic material is secured in a frame and is softened by radiant heat. The softened sheet is brought adjacent the mold cavity and is drawn into the cavity to assume the conformation thereof by air being withdrawn from the cavity through cracks therein resulting from the loosely fitting forming members. One or more layers of fiberglass and polyester resinous material applied to a face of the backing shell completes the dasher board.

12 Claims, 14 Drawing Figures

MOLD CONSTRUCTION METHOD AND APPARATUS FOR MAKING PLASTIC BACKINGS FOR SKATING RINK DASHER BOARDS

BACKGROUND OF THE INVENTION

1. Field of the Invention

This invention relates to dasher boards for skating rinks and more particularly to the mold, method of, and apparatus for forming backing shells for dasher boards of plastic sheet material and the method of making the dasher board itself.

2. Prior Art and Objects of the Invention

Applicant is unaware of any mold construction in the prior art such as that disclosed or a molding apparatus or method employing such a mold construction for making plastic backing shells for fiberglass dasher boards for skating rinks or any other object. The dasher boards capable of being formed with the backing made by the mold, method, and apparatus herein disclosed are shown generally in my U.S. Pat. No. 3,883,120 of May 13, 1975 entitled "Monolithic Dasher Board for Skating Rinks" and are essentially a waist-high retaining wall around the outer periphery of the rink when positioned vertically end to end. Heretofore, the dasher boards set forth in my afore-mentioned patent were made by placing numerous, successive layers of fiberglass and polyester resinous material directly on a positive mold coated with a release gel. After the resinous material had cured, the completed board could be removed from the mold. This method had the serious drawback that numerous positive molds had to be provided so that other boards could be in the process of being formed while others were curing. Such positive molds were very expensive. The backing shells of the present invention provide an inexpensive positive mold which becomes an integral part of each completed dasher board, thus speeding up production, reducing mold and material costs, and eliminating the necessity of a release gel.

The formation of plastic objects by drawing a heated plastic sheet into a negative mold is shown in U.S. Pat. No. 2,749,572 issued June 12, 1956. In this type of apparatus, the air is withdrawn from an area proximate to the molding surface through a plurality of small holes formed through the molding surface. Generally, the more holes present the more uniformly distributed the vacuum is and the better the heated plastic can be made to conform to the contours of the mold surface. This is particularly true when the objects are relatively small and the curved surfaces are gradual and not sharp. However, when the object to be formed is large such as a 4 by 8 foot dasher board for skating rinks which is basically a five sided, rectangular shaped box having sharply defined edges, the problems of constructing a mold to vacuum form such a board are considerable. Further, if parts of the mold itself must be capable of being removed so that the completed dasher board can be removed from the mold, the problem of providing a mold construction with the proper vacuum distribution is magnified. Applicant has discovered that by making all of the forming members loosely fitting within a vacuum box and providing a channel in the forming members for distributing the vacuum to the cracks formed between the forming members themselves as well as between the forming members and the vacuum box, a superior mold results and one which is particularly suited for use in a method and apparatus for molding large, rectangular shape, box-like objects.

It is therefore the primary object of the present invention to provide a novel mold construction, method and apparatus for vacuum forming backing shells for skating rink dasher boards and a novel method of making the dasher board itself.

It is another object of the invention to provide an apparatus and mold construction which is particularly suited to vacuum forming large objects having the walls thereof substantially perpendicular to each other.

It is a further object of the invention to provide an apparatus and a mold for use therewith which is uncomplicated in design and made of inexpensive materials.

It is a still further object of the invention to provide a method of making a complete dasher board for skating rinks.

The novel features which are believed to be characteristic of the invention both as to its organization and method of operation, together with further objectives and advantages thereof will be better understood from the following description considered in connection with the accompanying drawings in which a presently preferred embodiment of the invention is illustrated by way of example. It is to be expressly understood, however, that the drawing is for the purpose of illustration and description only, and is not intended as a definition of the limits of the invention.

DESCRIPTION OF THE PREFERRED EMBODIMENT

Figure 1:
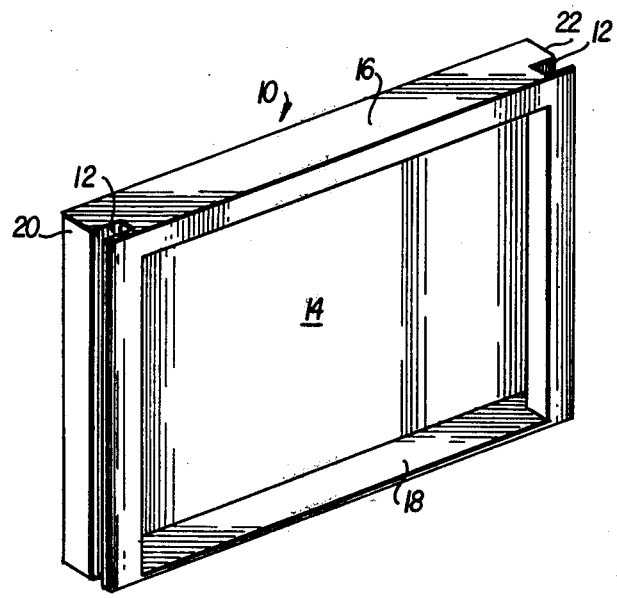
FIG. 1 is a perspective view of a backing shell for forming dasher boards for skating rinks capable of being made by the mold method and apparatus of the present invention.

Looking now in greater detail at the accompanying drawings, FIG. 1 illustrates generally a dasher board backing shell 10 capable of being made by the mold, method and apparatus to be hereinafter described. The dasher board backing shell 10 is made of a thermoplastic material such as an acrylic resin over which is built up successive layers of polyester resinous material reinforced with fiberglass to arrive at the completed dasher board. As aforementioned, when the dasher boards are placed end to end with like boards around the periphery of a skating rink, they act as a waist-high wall to retain skaters, hockey pucks and the like. The dasher board backing shell sections 10 have rectangular shaped grooves 12 on the ends thereof which receive a portion of a stanchion (not shown) for supporting the completed board sections in an upright position. The dasher board backing shell 10 has a flat front portion 14, a top and bottom portion 16, 18 respectively and end portions 20, 22. The portions 16, 18, 20 and 22 are all perpendicular to the front portion 14 and to the portions adjacent each other to thereby form, substantially, a five sided box.

Figure 2:
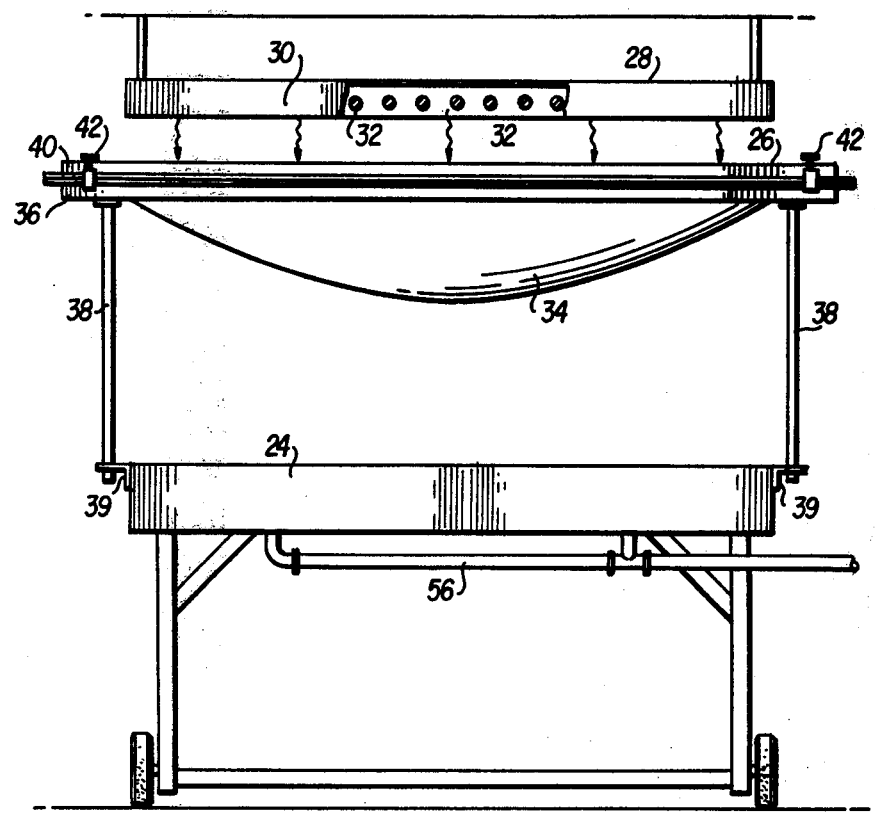
FIG. 2 is a side elevational view of the apparatus of the present invention.
Figure 3:
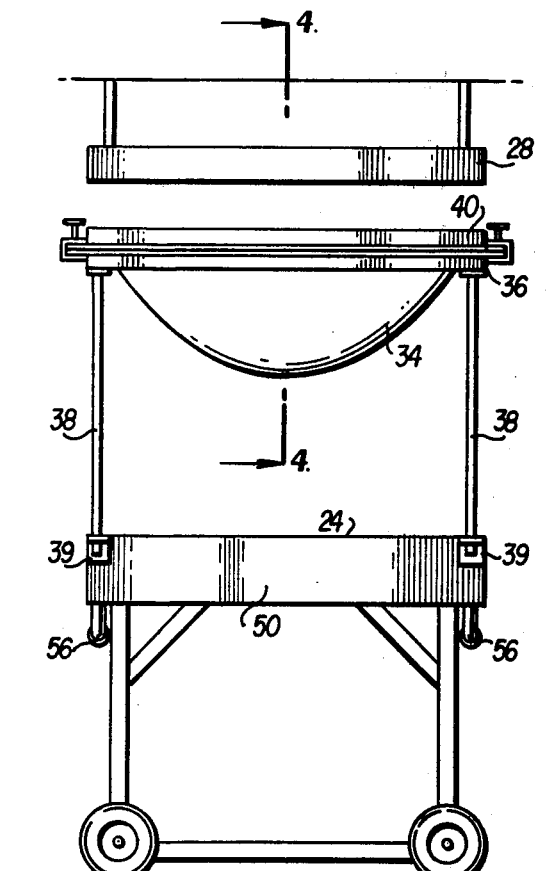
FIG. 3 is an end elevational view of the apparatus.
Figure 4:
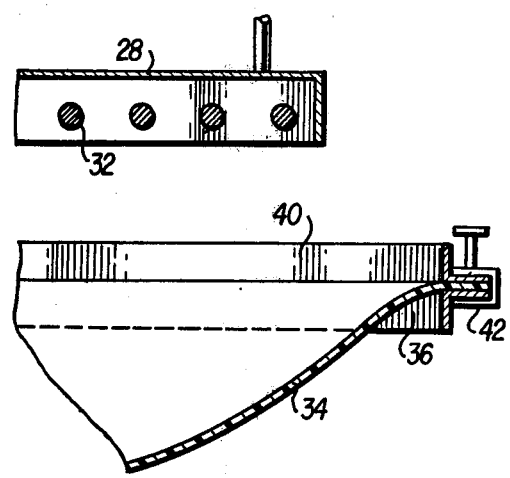
FIG. 4 is a partial cross-sectional view of the apparatus taken along the lines 4—4 of FIG. 3.

The apparatus for forming the aforedescribed dasher board backing shell 10 can best be seen by referring to FIGS. 2, 3 and 4. The apparatus comprises generally a mold 24, a frame 26 and a heater hood 28. The heater hood 28 is suitably suspended above the frame 26 and mold 24 and consists of an outer housing 30 containing a plurality of rows of elongated electrical resistance type heating elements 32. The heat from the hood 28 radiates downward toward the frame 26 which holds a sheet of thermoplastic material 34. The frame 26 comprises a lower frame member 36 which is rectangular in shape and formed of L-shaped metal. The lower frame member 36 has four rods 38 secured to the lower side thereof. The rods 38 are slidably mounted in brackets 39 secured to mold 24 for permitting the frame to move relative thereto. The frame 26 also has an upper frame member 38 which is constructed in the same manner as the lower member 36. The thermoplastic material 34 is maintained between the frame members 36, 38 by means of a C-type clamp 40 or the like.

The mold 24 of the apparatus comprises a vacuum box 44 having a bottom 46, side walls 48 and end walls 50. The vacuum box 44 is mounted on wheels 52 to permit the entire mold 24 and frame 26 to be moved into and out of position beneath the heater hood 28. The vacuum box 44 has a plurality of apertures 54 through the bottom wall 46 and connected by piping 56 to a source of vacuum (not shown). The vacuum box 44 can be made out of wood or other suitable, inexpensive material. The areas where the side and end walls meet each other and the bottom must be sealed to prevent air leakage.

Positioned within the vacuum box 44 is a mold matrix comprising a first set consisting of forming members 58, 60 and a second set consisting of forming members 62, 64. The forming members 58, 60 are disposed in the vacuum box 44 opposite each other and are slightly shorter than the side 48 of the box against which they are positioned resulting in a loose fit. Similarly, the forming members 62, 64 are disposed in the vacuum box 44 opposite each other and are slightly shorter than the distance between the forming members 58, 60 so that they too loosely fit in the box 44. When all of the forming members 58-64 are in position within the vacuum box 44 a mold cavity 65 results. The forming member 58 is rectangular in cross-section whereas the forming members 60, 62, 64 are L-shaped. The extended portion 66 of forming members 62, 64 form the grooves 12 of the dasher board 10 and the extended portion 67 forms the surface 13 as will be more fully described later. As a result of the loose fit of the forming members 58, 60, 62, 64 relative to the sides 48, 50 of the box 44, a narrow gap 68 is caused to exist therebetween. Similarly, a gap 70 is caused to exist between the ends of the forming members 62, 64 and the forming members 58, 60 by the loose fit therebetween. Also as the forming members 58, 60, 62, 64 rest on the bottom wall 46 a slight gap 72 exists therebetween. As can be seen, the gap 68 communicates with the gaps 70 and 72 leading into the mold cavity 65 as well as with the atmosphere adjacent the forming members 58-64 and the open end of the vacuum box 44.

Figure 8:
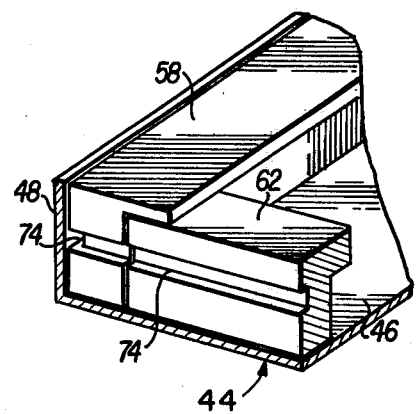
FIG. 8 is a partial perspective view of the junction of two of the forming members comprising the mold.

A substantially rectangular shaped channel 74 is provided in the side of the forming members 58-64 positioned opposite the side walls 48, 50. The channels 74 of adjacent forming members are in communication with each other around the inside of the vacuum box 44 as shown in FIG. 8 and serve to withdraw air from the gap 68 when a vacuum is caused to exist in the channel 74. The vacuum existing in piping 56 and apertures 54 is communicated to channels 74 by means of recesses 76 in forming members 58, 60, which recesses are located directly above the apertures 54. Thus, when the open end of the mold cavity 65 is covered, air in the cavity is withdrawn rapidly and uniformly through gaps 70 and 72 into gap 68 and from there into vacuum channel 74 and out through recesses 76 and piping 56.

Figure 9A:
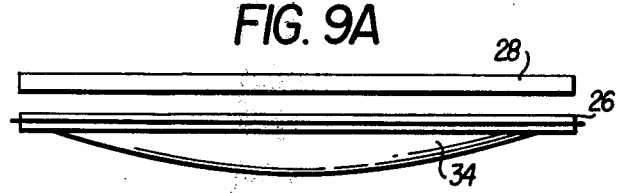
FIGS. 9a–e are a diagrammatic illustration of the formation of a dasher board backing shell according to the disclosed method.
Figure 9B:
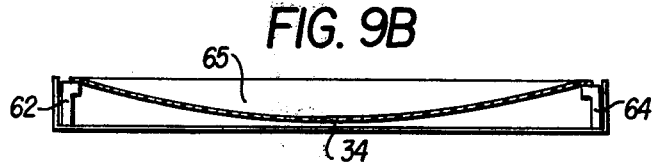
Figure 9C:
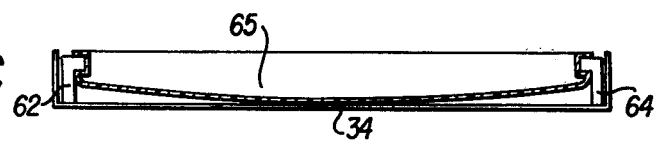
Figure 9D:
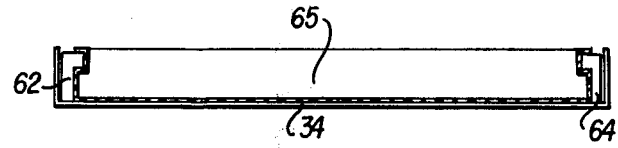
Figure 9E:
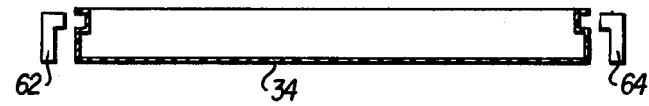

The method of operation of the apparatus and the mold will now be discussed with reference to FIGS. 9(a)–9(e). A sheet of thermoplastic material 46 is clamped between frame members 36, 40 and the entire mold 24 and frame 26 are moved to a position beneath the heater hood 28. The frame 26 is raised and maintained in a position adjacent the heater hood 28 as shown in FIG. 9(a) until the required degree of plasticity is achieved in the sheet 46. After the sheet of plastic material 34 is lowered to cover the opening of the mold cavity 65, a strong vacuum is caused to exist in channel 74 from a source not shown which vacuum is rapidly transmitted through gap 68 to the area adjacent the forming members 58-64 and the open end of the vacuum box 44. The vacuum in gap 68 acts adjacent the periphery of the plastic sheet 34 and draws it into sealing engagement with the periphery of the open end of the vacuum box 44 and the forming members 58-64 as shown in FIG. 9(b). With the open end of the mold cavity now sealed, the cavity is rapidly and uniformly exhausted of the air therein through gaps 70 and 72. Initially, as shown in FIG. 9(c) the plastic sheet material 34 is caused to form around the extended portions 66 and then as shown in FIG. 9(d) into the remainder of the mold cavity 65 to take the final shape and contour of the mold cavity 65. After the heated sheet material 34 has cooled the vacuum is terminated and the completed dasher board backing shell 10 together with forming members 62, 64 are removed from the vacuum box 44. The forming member extended portions 66 are removed from the grooves 12 formed thereby, see FIG. 9(e) and are returned to the vacuum box 44. The process can then be repeated. The finished dasher board backing shell 10 can be quickly trimmed of any excess material to place it in finished form.

Figure 10:
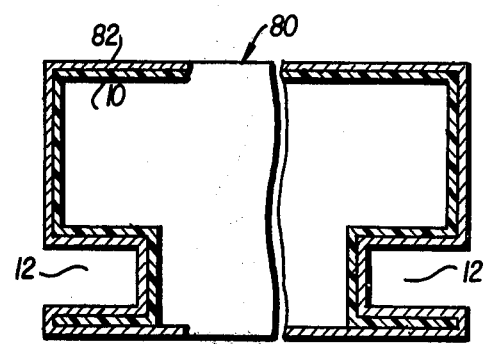
FIG. 10 is a partial view in partial cross-section of the completed dasher board.
Figure 5:
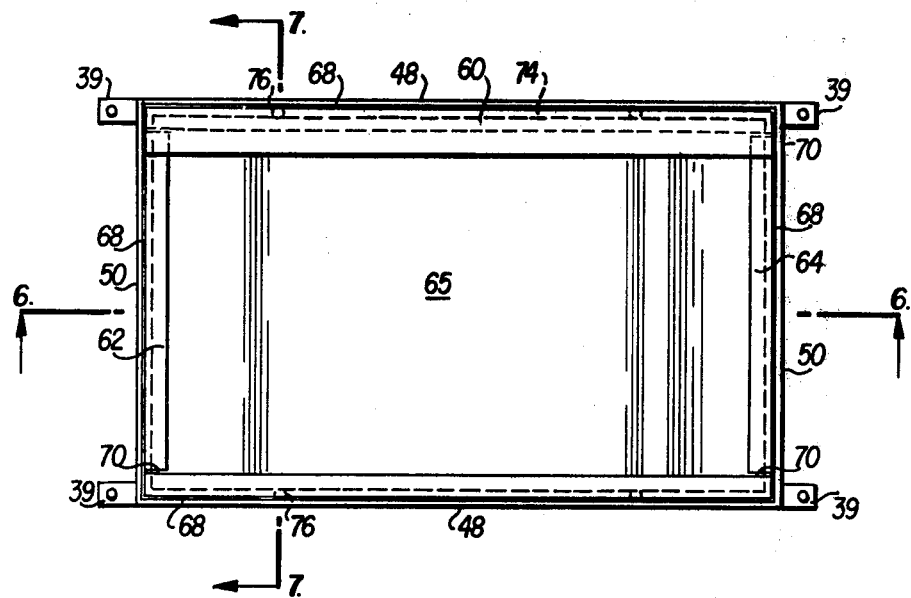
FIG. 5 is a plan view of the novel mold construction used in the apparatus of the present invention.
Figure 6:
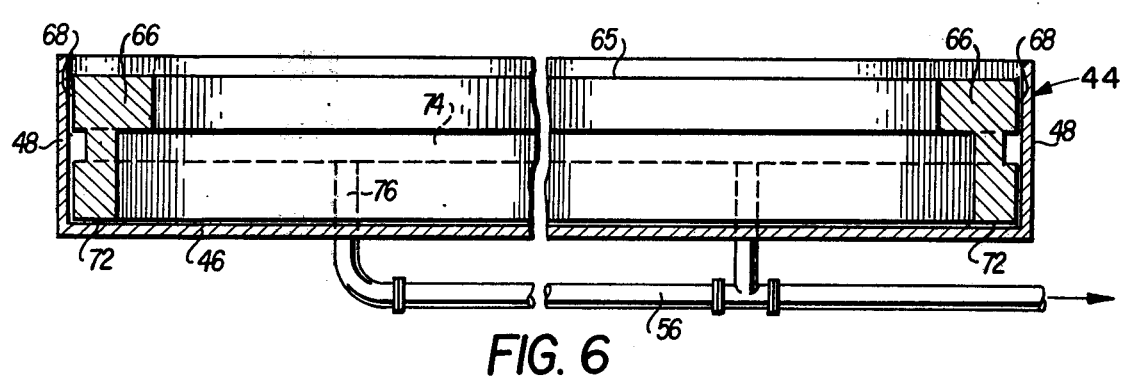
FIG. 6 is a cross-sectional view of the mold taken along the lines 6—6 of FIG. 5.
Figure 7:
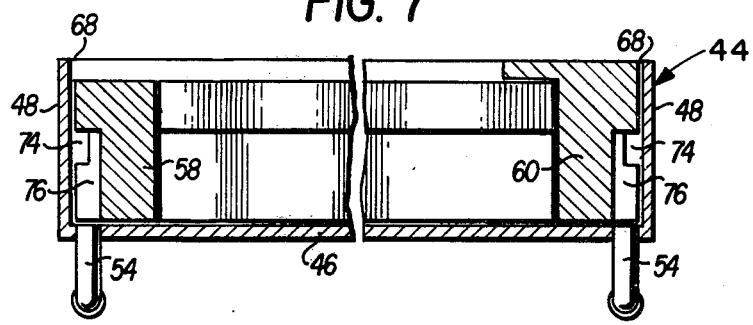
FIG. 7 is a cross-sectional view of the mold taken along the lines 7—7 of FIG. 5.

My invention further comprises the method of making the complete dasher board as partially shown at 80 in FIG. 10. After the dasher board backing shell 10 is formed by the mold 24 as hereinbefore described, the outer surface of the shell 10 is covered by fiberglass and polyester resinous material 82. The fiberglass and polyester material 82 may be in the form of one layer, as shown, or it may be in the form of a plurality of layers placed one on the other until the desired thickness is achieved. The shell 10 thus becomes an integral part of the completed dasher board and in effect reduces the number of layer of more costly fiberglass and polyester resinous material heretofore required when the dasher board was made entirely of such fiberglass and polyester resinous material.

The present invention has been described in detail above for purposes of illustration only and is not intended to be limited by this description or otherwise to exclude any variation or equivalent arrangement that would be apparent from or reasonably suggested by the foregoing disclosure to the skilled of the art.

What I claim is:

1. An apparatus for forming backing shells for skating rink dasher boards out of a single sheet of plastic material, said apparatus comprising:
    (a) a vacuum box having four side walls, a bottom and an open side adapted to support a mold matrix, said matrix having a first and second set of two removably fitting forming members each, the forming members of each of said sets being disposed in said box opposite each other adjacent said sides and said bottom of said box to form a mold cavity,
    (b) means communicating with the interior of said box for supplying a vacuum thereto,
    (c) means in said forming members for distributing said vacuum to an area between said first and second sets of forming members and said sides and bottom of said box,
    (d) heating means disposed above said box, and
    (e) a substantially horizontal frame means for clamping a sheet of said plastic material thereto, said frame being movable from a position adjacent said heating means for softening said plastic sheet to a position adjacent said open side of said box whereby upon creation of said vacuum said soft plastic sheet is drawn into said mold cavity to form said dasher board backing shell.

2. An apparatus as set forth in claim 1 wherein said forming members are loosely fitted in said vacuum box to enable said plastic material to be drawn toward the edges of said forming members by said vacuum.

3. An apparatus as set forth in claim 2 wherein said means in said forming members comprises a groove on the side thereof facing said sides of said box, the grooves of adjacent forming members being in communication with each other.

4. An apparatus as set forth in claim 3 wherein said means for supplying a vacuum to said interior of said box is a manifold connected to a vacuum source and to at least one recess extending through the bottom of said box beneath said first set of forming members, said first set of forming members having an aperture connecting said groove with said recess.

5. An apparatus as set forth in claim 2 wherein said frame means comprises two rectangular shaped clamping plates disposed opposite each other and between which said sheet of plastic material is positioned, said plates being substantially L-shaped in cross-section.

6. A mold for forming a dasher board backing shell out of a thermoplastic sheet drawn against the walls of a mold cavity by withdrawing air through cracks formed in said walls of said mold, said mold comprising a box having four side walls, a bottom and an open side adapted to support a mold matrix, said matrix having a first and second set of two forming members, said forming members of said first set being positioned opposite each other adjacent two of said side walls, the length of said forming members of said first set being slightly less than said adjacent side walls, and said forming members of said second set being positioned opposite each other adjacent the other two side walls and between said forming members of said first set, said forming members of said second set being slightly less in length than the distance between said forming members of said first set, said forming members being movable relative to each other and to said box to ensure formation of said cracks as said air is being withdrawn from said mold cavity.

7. A mold as set forth in claim 6 wherein said forming members each have a channel means running the length thereof in the side of said forming members facing said side walls for transmitting a vacuum from a source to the area between said forming members and said side walls.

8. A mold as set forth in claim 7 wherein said bottom of said box has apertures therethrough for communication with a source of vacuum and said channel means of said first set of framing members has at least one recess extending between said channel means and said aperture for transmitting said vacuum from said source to said channel means.

9. A mold as set forth in claim 7 wherein said grooves of adjacent channel members are in communication with each other.

10. A method of forming a backing shell for skating rink dasher boards out of a single sheet of plastic material, said method comprising the steps of:
    (a) providing a mold with a vacuum box having four side walls, a bottom and an open side adapted to support a mold matrix, said matrix having a first and second set of two forming members each, the forming members of each of said sets being disposed in said box opposite each other adjacent said sides and said bottom of said box to form a mold cavity, said forming members being loosely and removably fitted relative to said box and each other to form cracks through which air is withdrawn from said mold cavity by means of vacuum from a source,
    (b) clamping said sheet of plastic material in a frame,
    (c) positioning said sheet of plastic material and said frame adjacent a source of radiant heat until the plasticity of said sheet is increased a desired amount, and
    (d) lowering said sheet to a position over said open side so as to seal said open side and permit said plastic sheet to be drawn into said mold cavity by said vacuum to assume the conformation thereof.

11. A method of forming a dasher board for skating rinks comprising the steps of:
    (a) providing a backing shell having the configuration of the dasher board to be formed,
    (b) covering the outer surface of said backing shell with at least one layer of fiberglass and polyester resinous material, and
    (c) permitting said material to cure in contact with said backing shell to form said dasher board.

12. A method of forming a dasher board as set forh in claim 11 wherein said backing shell is made of a plastic-like material.

* * * * *